Sept. 16, 1924.  
J. DENSLEY  
AUTOMOBILE HEATER  
Filed Jan. 10, 1923  
1,508,383
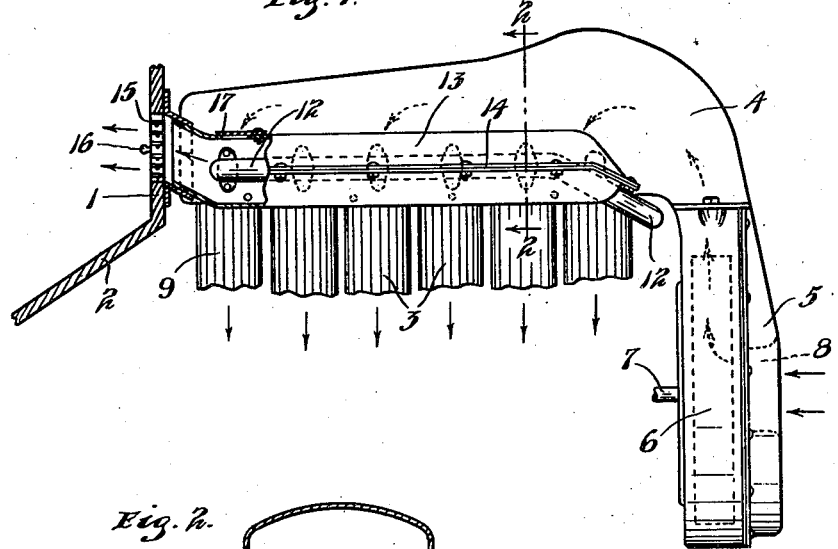
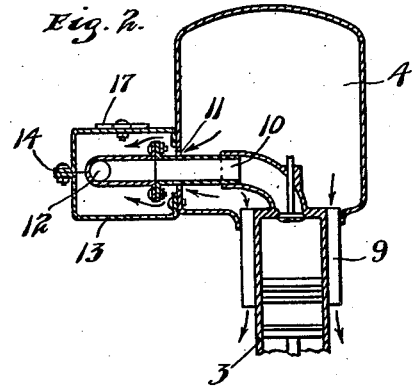
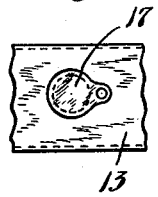
INVENTOR.  
JOHN DENSLEY.  
BY HIS ATTORNEY.  
James F. Williamson Patented Sept. 16, 1924.

1,508,383

UNITED STATES PATENT OFFICE.

JOHN DENSLEY, OF MINNEAPOLIS, MINNESOTA.

AUTOMOBILE HEATER.

Application filed January 10, 1923. Serial No. 611,761.

*To all whom it may concern:*

Be it known that I, JOHN DENSLEY, a citizen of the United States, residing at Minneapolis, in the county of Hennepin and State of Minnesota, have invented certain new and useful Improvements in Automobile Heaters; and I do hereby declare the following to be a full, clear, and exact description of the invention, such as will enable others skilled in the art to which it appertains to make and use the same.

This invention relates to an automobile and particularly to a heating device for the body thereof. While the device might be used with other types of automobiles, it is particularly designed to be used with an automobile having an air-cooled engine in which there is a blower casing or housing extending over the cylinders. In such air-cooled engines, particularly of the type of the new Franklin Motor Car Company's engine, a blower fan is located at the front of the engine and delivers air into a housing extending over the cylinders. The air pressure is raised considerably in this housing and the air therein passes downwardly under pressure around the casing surrounding the cylinders of the engine. The said housing or casing has apertures through one side through which pass the exhaust pipes connecting with the exhaust manifold. The casing or housing is not fitted tightly about the exhaust pipes so that there is a small annular opening about each of said pipes.

It is an object of this invention to provide means enclosing said apertures and utilizing the air issuing therethrough, due to the air pressure in said housing for the purpose of heating the body of the automobile.

It is a further object of the invention to provide such means in the form of a casing extending along the side of the said housing which casing encloses said apertures and also encloses the exhaust manifold or exhaust pipe extending along side of the cylinders, which casing is closed at its front end but communicates at its rear end with the body of the automobile.

It is still another object of the invention to provide a regulating means for controlling the passage of air from said casing into the body of the automobile and also to provide a valve-equipped opening in the said casing which extends alongside of the said housing.

These and other objects and advantages of the invention will be fully set forth in the following description made in connection with the accompanying drawings, in which like reference numerals refer to the same parts throughout the different views, and in which, Fig. 1 is a view in side elevation showing the upper part of the engine, blower casing and the casing along the side thereof, part of the latter casing and the body of the automobile being shown in section;

Fig. 2 is a vertical section taken on the line 2—2 of Fig. 1, as indicated by the arrows; and Fig. 3 is a partial plan view of Fig. 1.

Referring to the drawings, the front portion or dash of an automobile body is indicated as 1, from which extends the engine board or foot board 2. The cylinders of the engine are designated as 3 and the housing or blower casing extending thereover, as 4. This housing includes a portion 5 in which rotates the blower fan 6 denoted by dotted lines driven by the crank shaft 7 of the engine. The air enters the portion 5 through the eye opening 8 of the fan casing and is blown up into the casing 4. It will be noted that the cylinders are provided with a plurality of radially extending fins 9. An exhaust pipe 10 extends laterally from each cylinder and the housing 4 is provided with a plurality of apertures 11 through which said exhaust pipes pass, said pipes connecting with the main exhaust pipe or manifold 12 extending along one side of the cylinders.

In accordance with the present invention, a casing 13 is provided, preferably formed of two parts connected together by having their flanges 14 joined by headed and nutted bolts. The casing 13 is closed at its forward end and has its rear end open and communicating with an opening through the dash 1 leading into the body of the automobile. This latter opening is provided with a plurality of pivoted shutters 15 adapted to be swung by means of the handle 16 to open and close, to the extent desired, the said opening. The top of the casing 13 is provided adjacent its rear end with an opening having a swinging pivoted valve 17 adapted to close or open the same to any desired extent. The casing 13 fits closely against the housing 4.

In the type of engine described, the fan 6 delivers air upward into the housing 4 and the air pressure in this housing is raised considerably above atmospheric pressure. This air under pressure passes down at high speed and around the cylinders 2 between the fins thereof and cools the said cylinders. Some of this air, due to the stated air pressure, issues through the annular openings about the exhaust pipes 10. Heretofore, this air has simply been wasted and passed into the hood chamber. With the present invention, the air passing through the apertures 11 about the pipes 10 passes into the casing 13 and is delivered at the rear thereof into the body of the automobile. This air is heated by contact with the exhaust pipes 10 and 12 and thus heats the automobile body. It has been found, in practice, that a sufficient amount of air passes through the openings 11 to furnish ample heat for the car even in coldest weather. If the heating effect is too great, the regulating shutters 15 can be adjusted as desired. At certain times when the engine is being run, it is desirable not to run the air into the body of the automobile and the regulating shutters 15 will be entirely closed. At such times, an outlet should be provided for the air delivered in the casing 13 and the valve 17 can be adjusted to form such an outlet. Under the usual operating conditions, however, the valve 17 is in closed position, as shown in Fig. 3.

From the above description it is seen that applicant has provided a simple and efficient heating device for an automobile of the type described. As previously stated, the type of engine is used in the new Franklin automobile. The previous types of this automobile had a suction fan at the rear end of the engine and it is apparent that with such an arrangement the present invention could not be used. It is due to the fact that the air is under pressure in the casing 4 and issues through the openings 11 that gives such a high degree of utility to the present structure. The invention can be readily applied to a standard engine and car without substantial change therein and forms a simple and valuable addition thereto. The invention has been amply demonstrated in actual practice and found to be very simple and efficient.

It will, of course, be understood that various changes may be made in the form, details, and arrangement and proportions of the parts without departing from the scope of applicant's invention, which, generally stated, consists in the matter shown and described and set forth in the appended claims.

What is claimed is:

1. The combination with an automobile and the blower casing of an air cooled engine, said casing having lateral apertures therethrough for the passage of exhaust pipes of said engine, of a casing extending along the side of said first mentioned casing and enclosing the apertures and extending rearwardly to have communication with the body of the automobile whereby air will pass out of said apertures from said first mentioned casing into said second mentioned casing and into the automobile body.

2. The combination with an automobile having an air cooled engine with a housing extending over the cylinders thereof, and means at the front end of the housing for producing a pressure of air therein, said housing having apertures through which the exhaust pipes of the engine pass, of a casing extending along said housing and secured thereto enclosing said apertures and said exhaust pipe and extending rearwardly to and communicating with the body of the automobile whereby air heated within the housing will pass through said apertures around said exhaust pipes to be further heated and then passed into the body of the automobile.

3. The combination with an automobile and the engine thereof which has a housing extending thereover, and means for producing a pressure of air in said housing, said housing having apertures in the sides thereof through which the exhaust pipes pass to the exhaust manifold, of a casing secured to said housing and enclosing said apertures and the exhaust manifold and connected at its rear end to the automobile body whereby air will pass from said housing into the said casing and into the automobile body.

4. The combination with an automobile and the engine thereof, said engine having a closed casing extending over the cylinders, means for producing a pressure of air in said casing, of a second casing extending along the side of the first mentioned casing and communicating therewith, said second mentioned casing communicating with the body of the automobile at its rear end whereby air will be delivered from the first mentioned casing into the second mentioned casing and into said automobile body.

5. The combination with an automobile having a lower casing disposed about the cylinders of the engine thereof, of an auxiliary casing surrounding the manifold and the exhaust pipes which connect the cylinders with the manifold, having communication with the blower casing through apertures therein about said exhaust pipes, and an air delivery means extending into the body of the automobile whereby air heated within the blower casing by the cylinders will pass for further heating over the several exhaust pipes and the manifold.

In testimony whereof I affix my signature.

JOHN DENSLEY,